United States Patent [19]

Bird

[11] Patent Number: 6,059,499
[45] Date of Patent: May 9, 2000

[54] RETRACTABLE CARGO SECUREMENT STRAP

[76] Inventor: Jennifer E. Bird, 6507 W. 7800 South, West Jordan, Utah 84088

[21] Appl. No.: 09/074,091

[22] Filed: May 7, 1998

[51] Int. Cl.⁷ .................................................. B60P 7/08
[52] U.S. Cl. ........................... 410/103; 410/106; 410/110
[58] Field of Search ............................... 410/12, 100, 101, 410/103, 106, 110, 116; 296/43; 254/217, 223, 364; 248/499

[56] References Cited

U.S. PATENT DOCUMENTS

| | | | |
|---|---|---|---|
| 2,946,563 | 7/1960 | Eaton | 410/37 |
| 2,991,975 | 7/1961 | Alexander | 410/103 |
| 4,382,736 | 5/1983 | Thomas | 410/103 X |
| 4,842,458 | 6/1989 | Carpenter | 410/103 X |
| 5,145,299 | 9/1992 | Stephenson, Jr. | 410/100 |
| 5,217,208 | 6/1993 | Stephenson | 410/103 X |
| 5,282,706 | 2/1994 | Anthony et al. | 410/100 |
| 5,490,749 | 2/1996 | Arbues | 410/103 |
| 5,664,918 | 9/1997 | Heider et al. | 410/103 |
| 5,738,471 | 4/1998 | Zentner et al. | 410/110 |
| 5,800,105 | 9/1998 | Stump | 410/103 |

FOREIGN PATENT DOCUMENTS

| | | | |
|---|---|---|---|
| 2273481 | 6/1994 | United Kingdom | 410/100 |

*Primary Examiner*—Stephen T. Gordon

[57] ABSTRACT

A retractable strap assembly is provided including a housing. Also included is a threaded post and a pair of clamps for removably and fixedly mounting the housing to a vehicle. Next included is a spool assembly situated within the housing and having a strap with a coupler on an end thereof. The strap is capable of being retracted within the housing.

7 Claims, 4 Drawing Sheets

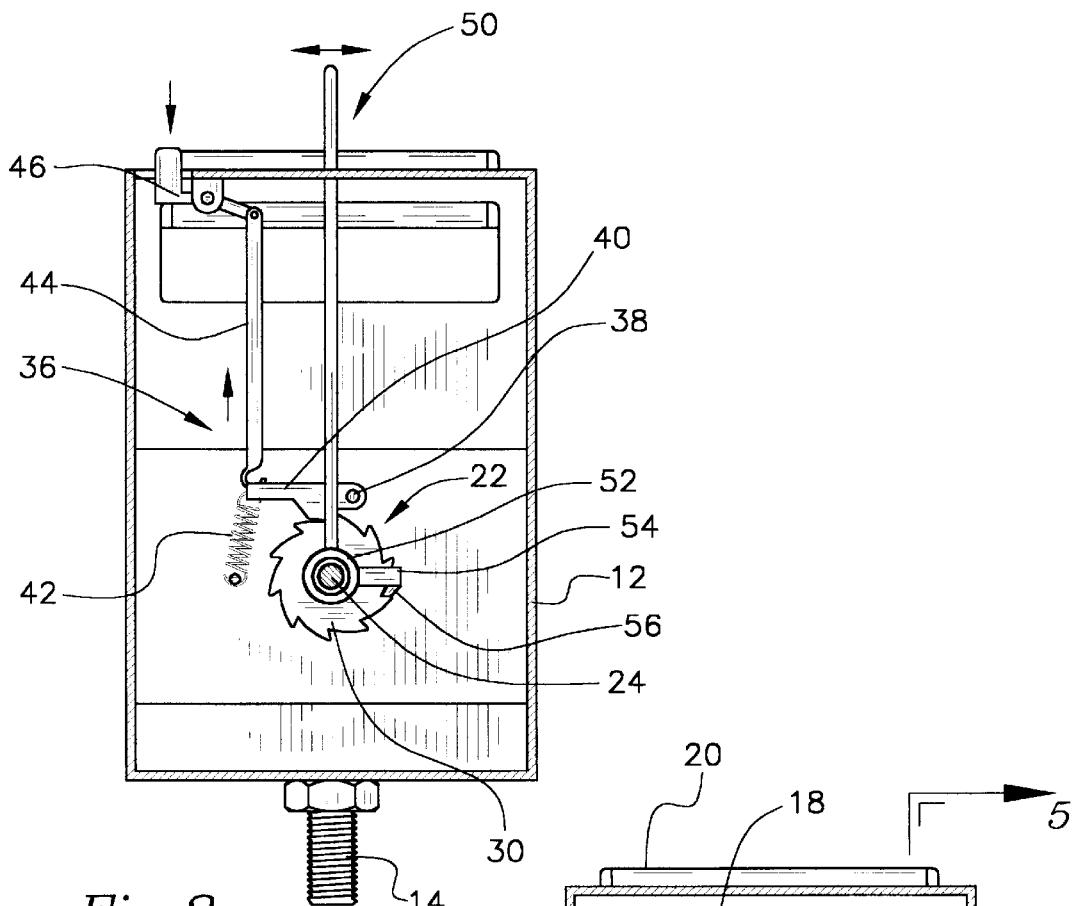

RETRACTABLE CARGO SECUREMENT STRAP

BACKGROUND OF THE INVENTION

1. Field of the Invention

The present invention relates to cargo securement straps and more particularly pertains to a new retractable cargo securement strap for conveniently securing cargo within a truck bed.

2. Description of the Prior Art

The use of cargo securement straps is known in the prior art. More specifically, cargo securement straps heretofore devised and utilized are known to consist basically of familiar, expected and obvious structural configurations, notwithstanding the myriad of designs encompassed by the crowded prior art which have been developed for the fulfillment of countless objectives and requirements.

Known prior art cargo securement straps include U.S. Pat. Nos. 4,842,458; 5,282,706; U.S. Pat. Des. 378,048; U.S. Pat. Nos. 4,243,350; 3,428,331; and 2,768,004.

In these respects, the retractable cargo securement strap according to the present invention substantially departs from the conventional concepts and designs of the prior art, and in so doing provides an apparatus primarily developed for the purpose of securing cargo within a truck bed.

SUMMARY OF THE INVENTION

In view of the foregoing disadvantages inherent in the known types of cargo securement straps now present in the prior art, the present invention provides a new retractable cargo securement strap construction wherein the same can be utilized for securing cargo within a truck bed.

The general purpose of the present invention, which will be described subsequently in greater detail, is to provide a new retractable cargo securement strap apparatus and method which has many of the advantages of the cargo securement straps mentioned heretofore and many novel features that result in a new retractable cargo securement strap which is not anticipated, rendered obvious, suggested, or even implied by any of the prior art cargo securement straps, either alone or in any combination thereof.

To attain this, the present invention generally comprises a housing having a pair of planar rectangular faces with a peripheral side wall formed therebetween. As shown in the Figures, the peripheral side wall includes a pair elongated side faces, a short top face, and a short bottom face. The bottom face of the housing has a threaded post coupled to a central extent thereof and extended downwardly therefrom. In use, the threaded post is adapted for securing the housing to the truck bed. For further securing the housing to the truck bed, the housing includes a pair of arcuate clamps each pivotally coupled at an inboard end thereof to the side faces of the housing. Associated therewith is a pair of clamp levers each pivotally mounted at an inboard end thereof adjacent to the associated arcuate clamp. In use, the arcuate clamps are adapted for pivoting from a downward vertical orientation to a horizontal orientation upon the rotation of the associated clamp lever from an upward vertical orientation to a horizontal orientation. Next provided is a spool assembly including a rod rotatably coupled between the side faces of the housing within an interior space of housing. A cargo strap has a first end coupled to the rod and a second end extending through a bore formed in the top face of the housing with a hook coupler mounted thereon. For constraining the strap when wrapped about the rod, a pair of circular plates are coupled to the rod and spaced from the side faces of the housing. FIGS. 2 & 4 show a pair of spring containers each mounted on one of the side faces of the housing about an associated end of the rod. A coil spring is situated about the rod and has a first end coupled to the rod and a second end coupled to the spring container. In use, the coil spring is adapted for urging the strap into a retracted orientation. Also included is a locking assembly having a pivot member coupled between the spring containers and residing above the rod of the spool assembly in parallel relationship therewith. As shown in FIG. 3, a pawl is provided having a first end pivotally coupled to the pivot member. An intermediate portion of the pawl is releasably engaged with one of a plurality of cutouts formed in an adjacent circular plate of the spool assembly. By these cut outs, the associated circular plate of the spool assembly defines a ratchet wheel. In operation, the pawl has a first orientation for precluding the rotation of the spool and reeling of the strap. In a second orientation, the pawl is adapted for allowing the rotation of the spool and reeling of the strap. Connected between a second end of the pawl and the housing is a coil spring for urging the pawl into the first orientation thereof. An elongated arm has a first end pivotally coupled to the second end of the pawl. A push button lever is equipped with an intermediate extent pivotally coupled to the top face of the housing, as shown in FIG. 3. A first end of the push button lever extends through a cut out formed in the top face of the housing. Associated therewith is a second end pivotally coupled to a second end of the elongated arm. By this structure, the pawl is disengaged with the ratchet wheel in the second orientation thereof upon the depression of the first end of the push button lever. Finally, a tightening stick includes an elongated bar with a lower end having an eyelet formed therein. Such eyelet is adapted for rotatably receiving a portion of the rod between the ratchet wheel and one of the spring containers. The elongated bar has an upper end which extends through an elongated slot formed in the top face. The tightening stick further includes a radially extending member with a spring biased pawl mounted thereon. Such spring biased pawl serves to engage the ratchet wheel when rotated in a first direction and disengage the ratchet wheel when rotated in a second orientation, thereby reeling the strap when the elongated bar is reciprocated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new retractable cargo securement strap apparatus and method which has many of the advantages of the cargo securement straps mentioned heretofore and many novel features that result in a new retractable cargo securement strap which is not anticipated, rendered obvious, suggested, or even implied by any of the prior art cargo securement straps, either alone or in any combination thereof.

It is another object of the present invention to provide a new retractable cargo securement strap which may be easily and efficiently manufactured and marketed.

It is a further object of the present invention to provide a new retractable cargo securement strap which is of a durable and reliable construction.

An even further object of the present invention is to provide a new retractable cargo securement strap which is susceptible of a low cost of manufacture with regard to both materials and labor, and which accordingly is then susceptible of low prices of sale to the consuming public, thereby making such retractable cargo securement strap economically available to the buying public.

Still yet another object of the present invention is to provide a new retractable cargo securement strap which provides in the apparatuses and methods of the prior art some of the advantages thereof, while simultaneously overcoming some of the disadvantages normally associated therewith.

Still another object of the present invention is to provide a new retractable cargo securement strap for securing cargo within a truck bed.

Even still another object of the present invention is to provide a new retractable cargo securement strap that includes a housing. Also included is a threaded post and a pair of clamps for removably and fixedly mounting the housing to a vehicle. Next included is a spool assembly situated within the housing and having a strap with a coupler on an end thereof. The strap is capable of being retracted within the housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side cross-sectional view of the present invention taken along line 3—3 shown in FIG. 2.

FIG. 4 is a side cross-sectional view of the present invention taken along line 4—4 shown in FIG. 2.

DESCRIPTION OF THE PREFERRED EMBODIMENT

Figure 1:
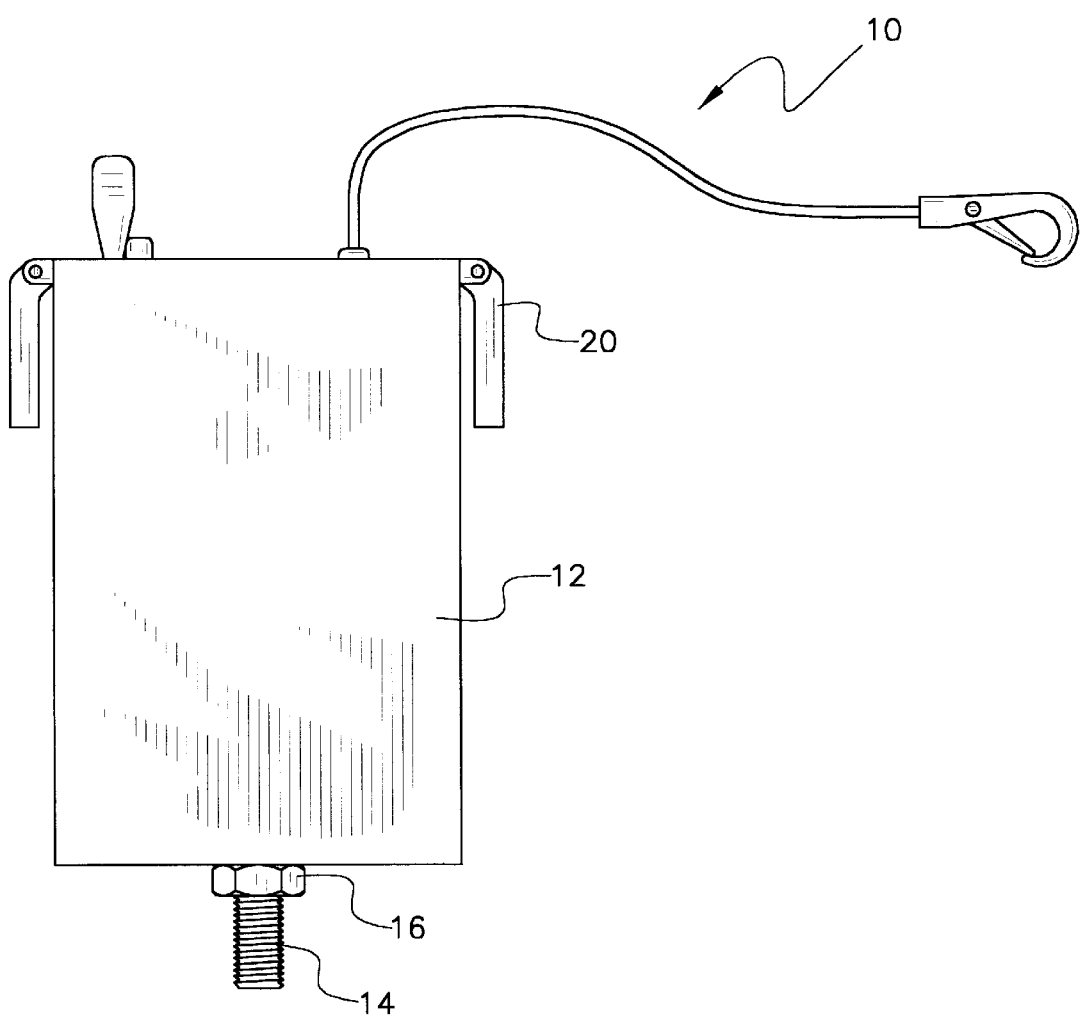
FIG. 1 is a side view of a new retractable cargo securement strap according to the present invention.

With reference now to the drawings, and in particular to FIGS. 1 through 5 thereof, a new retractable cargo securement strap embodying the principles and concepts of the present invention and generally designated by the reference numeral 10 will be described.

The present invention, designated as numeral 10, includes a housing 12 having a pair of planar rectangular faces with a peripheral side wall formed therebetween. As shown in the Figures, the peripheral side wall includes a pair elongated side faces, a short top face, and a short bottom face. The bottom face of the housing has a threaded post 14 coupled to a central extent thereof and extended downwardly therefrom. In use, the threaded post is adapted for being inserted within a bore positioned on a bottom face of a recess formed in the side wall of the truck bed. Further, a bolt 16 is screwably engaged with the threaded post for securing the housing to the truck bed.

For further securing the housing to the truck bed, the housing includes a pair of arcuate clamps 18 each pivotally coupled at an inboard end thereof to one of the side faces of the housing. Associated therewith is a pair of clamp levers 20 each pivotally mounted at an inboard end thereof adjacent to the associated arcuate clamp. It should be noted that the arcuate clamps and the clamp levers each have a length which is approximately equal to that of the side faces of the housing. In use, the arcuate clamps are adapted for pivoting from a downward vertical orientation to a horizontal orientation upon the rotation of the associated clamp lever from an upward vertical orientation to a horizontal orientation. This may be accomplished by equipping each of the clamp levers and arcuate clamps with a gear portion. Note FIG. 5. In the preferred embodiment, a spring is coupled between the clamp levers and arcuate clamps for urging the same together. It should be noted that the arcuate clamps are adapted to be extended laterally for abutting an upper peripheral lip formed on the aforementioned recess of the truck bed side wall.

Figure 5:
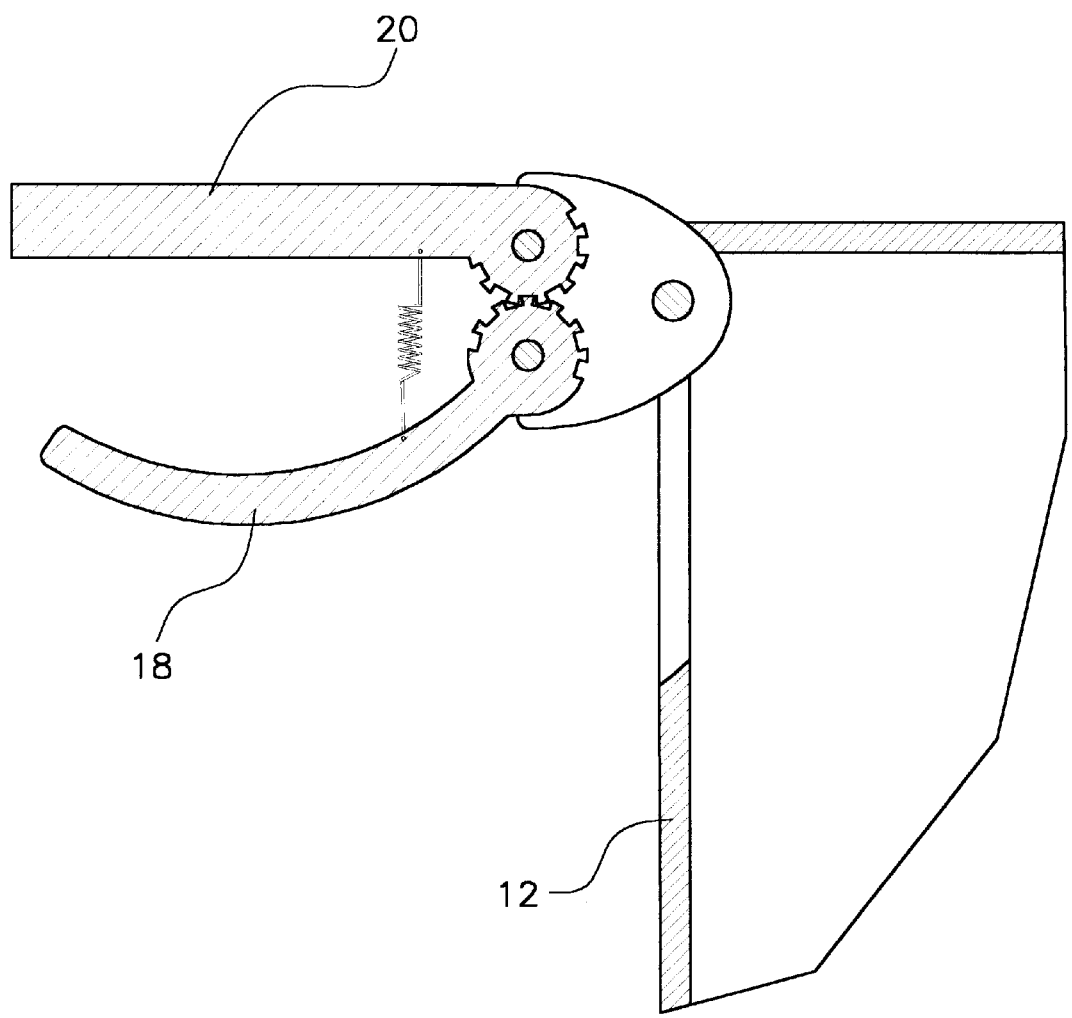
FIG. 5 is a side cross-sectional view of the present invention taken along line 5—5 shown in FIG. 4.

Each the clamp lever and arcuate clamp combination is adapted to be pivoted together with respect to the housing while being maintained in parallel. This may be accomplished by additional pivots member, as shown in FIG. 5. For storage purposes, the side faces of the housing are preferably equipped with cut outs for releasably receiving the arcuate clamps. Note FIG. 1.

Figure 2:
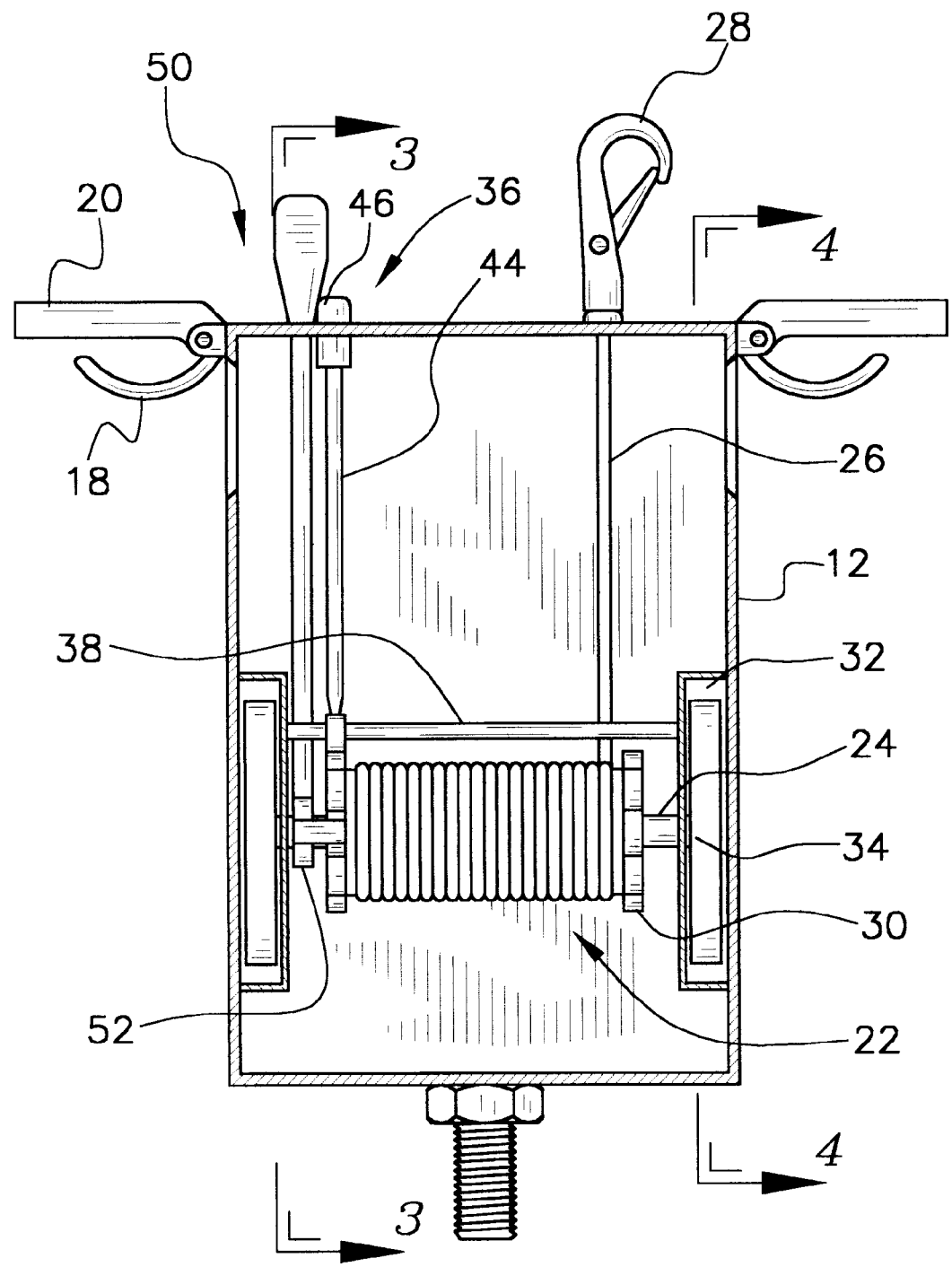
FIG. 2 is a front cross-sectional view of the present invention.

Next provided is a spool assembly 22 including a rod 24 rotatably coupled between the side faces of the housing within the interior space thereof. A cargo strap 26 has a first end coupled to the rod and a second end extending through a bore formed in the top face of the housing with a hook coupler 28 mounted thereon. The hook coupler preferably has a spring biased clip for affording a closed loop, as shown in FIG. 2. For constraining the strap when wrapped about the rod, a pair of circular plates 30 are coupled to the rod and spaced from the side faces of the housing. FIGS. 2 & 4 show a pair of spring containers 32 each mounted on one of the side faces of the housing about an associated end of the rod. A coil spring 34 is situated about the rod and has a first end coupled to the rod and a second end coupled to the spring container. In use, the coil spring is adapted for urging the strap into a retracted orientation. As an option, the spool assembly may be equipped with components similar to those employed in the art of seat belts for the purpose of allowing the automatic locking of the strap when extended.

Also included is a locking assembly 36 having a pivot member 38 coupled between the spring containers and residing above the rod of the spool assembly in parallel relationship therewith. As shown in FIG. 3, a pawl 40 is provided having a first end pivotally coupled to the pivot member. An intermediate portion of the pawl is releasably engaged with one of a plurality of cutouts formed in an adjacent circular plate of the spool assembly. By these cut outs, the associated circular plate of the spool assembly defines a ratchet wheel.

In operation, the pawl has a first orientation for precluding the rotation of the spool and reeling of the strap. In a second orientation, the pawl is adapted for allowing the rotation of the spool and reeling of the strap.

Connected between a second end of the pawl and the housing is a coil spring 42 for urging the pawl into the first orientation thereof. An elongated arm 44 has a first end pivotally coupled to the second end of the pawl. A push button lever 46 is equipped with an intermediate extent pivotally coupled to the top face of the housing, as shown in FIG. 3. A first end of the push button lever extends through a cut out formed in the top face of the housing. Associated therewith is a second end pivotally coupled to a second end of the elongated arm. By this structure, the pawl is disengaged with the ratchet wheel in the second orientation thereof upon the depression of the first end of the push button lever.

Finally, a tightening stick 50 includes an elongated bar with a lower end having an eyelet 52 formed therein. Such eyelet is adapted for rotatably receiving a portion of the rod between the ratchet wheel and one of the spring containers. The elongated bar has an upper end which extends through an elongated slot formed in the top face of the housing. The tightening stick further includes a radially extending member 54 with a spring biased pawl 56 mounted thereon. Such spring biased pawl serves to engage the ratchet wheel when rotated in a first direction and disengage the ratchet wheel when rotated in a second orientation, thereby reeling the strap when the elongated bar is maneuvered within the slot in a reciprocating manner.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A retractable strap assembly for a truck bed comprising, in combination:

a housing including a pair of planar rectangular faces with a peripheral side wall formed therebetween, the peripheral side wall including a pair elongated side faces, a short top face, and a short bottom face, the bottom face having a threaded post coupled to a central extent thereof and extending downwardly therefrom for being inserted within a bore formed in a peripheral side wall of a truck bed, wherein a nut is screwably engaged with the threaded post for securing the housing to the truck bed;

said housing further including a pair of arcuate clamps each pivotally coupled at an inboard end thereof to the side faces of the housing adjacent to the top face thereof and a pair of clamp levers each pivotally mounted at an inboard end thereof adjacent to a respective one of said arcuate clamps for pivoting from a substantially vertical orientation to a substantially horizontal orientation upon the rotation of a respective one of said clamp levers from an upward vertical orientation to a horizontal orientation in parallel with a respective one of said arcuate clamps;

a spool assembly including a rod rotatably coupled between the side faces of the housing within an interior space of said housing, a cargo strap having a first end coupled to the rod and a second end extending through a bore formed in the top face of the housing with a hook coupler mounted thereon, a pair of circular plates coupled to the rod and spaced from the side faces of the housing for constraining the strap when wrapped about the rod, and a pair of spring containers each mounted on one of the side faces of the housing about an associated end of the rod with each said spring container including a coil spring situated about the rod and having a first end coupled to the rod and a second end coupled to the respective spring container for urging the strap into a retracted orientation;

a locking assembly including a pivot member coupled between the spring containers and residing above the rod of the spool assembly in parallel relationship therewith, a pawl having a first end pivotally coupled to the pivot member and an intermediate portion releasably engaged with one of a plurality of cutouts formed in an adjacent one of said circular plates of the spool assembly which defines a ratchet wheel with the pawl having a first orientation for precluding the rotation of the spool assembly and reeling of the strap and a second orientation for allowing the rotation of the spool assembly and reeling of the strap, a coil spring connected between a second end of the pawl and the housing for urging the pawl into the first orientation thereof an elongated arm having a first end pivotally coupled to the second end of the pawl, and a push button lever with an intermediate extent pivotally coupled to the top face of the housing with a first end of the push button lever extending through a cut out formed in the top face of the housing and a second end pivotally coupled to a second end of the elongated arm, wherein the pawl is disengaged with the ratchet wheel in the second orientation thereof upon the depression of the first end of the push button lever; and a tightening stick including an elongated bar with a lower end having an eyelet formed therein for rotatably receiving a portion of the rod between the ratchet wheel and one of the spring containers and an upper end extending through an elongated slot formed in the top face, the tightening stick further including a radially extending member with a spring biased pawl mounted thereon for engaging the ratchet wheel, thereby reeling the strap when the elongated bar is reciprocated.

2. A retractable strap assembly comprising:

a housing having a top face and a pair of side faces extending downwardly from the top face;

mounting means for removably and fixedly mounting the housing to a vehicle, the mounting means including a pair of mounting assemblies for abutting an upper peripheral lip of a recess on a truck bed side wall, each mounting assembly including a clamp and a clamp lever mounted on each of the side faces of the housing at a location adjacent to the top face of the housing, the clamp and clamp lever of each of the mounting assemblies each having an in board end pivotally mounted to the side wall, the inboard ends of the clamp and the clamp lever having interlocking teeth causing the clamp to pivotally rotate away from the clamp lever when the clamp lever is rotated away from the clamp and causing the clamp to rotate toward the clamp lever when the clamp lever is rotated toward the clamp such that the clamp abuts the upper peripheral lip of the recess; and a spool assembly situated within the housing and having a strap with a coupler on an end thereof, wherein the strap is retractable within the housing.

3. A retractable strap assembly as set forth in claim 2 wherein the spool assembly further includes locking means for preventing the reeling of the strap and coupler.

4. A retractable strap assembly as set forth in claim 3 wherein the locking means includes includes a locking assembly located in the housing and including a pawl releasably engaging one of a plurality of cutouts formed in a circular plate forming a portion of the spool assembly to define a ratchet wheel, wherein he pawl has a first orientation for precluding the rotation of the spool assembly and a second orientation for allowing the rotation of the spool assembly.

5. A retractable strap assembly as set forth in claim 2 wherein the spool assembly further includes a tightening assembly for reeling the strap upon the reciprocation of a stick extending through an elongated bore in a top face of the housing.

6. A retractable strap assembly as set forth in claim 2 wherein the means for mounting includes a threaded post extending downwardly from the housing.

7. A retractable strap assembly for a truck bed comprising:

a housing including a pair of faces with a peripheral side wall formed therebetween, the peripheral side wall including a pair elongated side faces, a top face, and a bottom face, the bottom face having a post coupled thereto and extending downwardly therefrom for insertion into a bore formed in a peripheral side wall of a truck bed;

said housing further including a pair of arcuate clamps each pivotally coupled at an inboard end thereof to the side faces of the housing adjacent to the top face thereof, and a pair of clamp levers each pivotally mounted at an inboard end thereof to the side faces of the housing adjacent to a respective one of said arcuate clamps, each of the arcuate clamps being adapted to pivot from a substantially vertical orientation to a substantially horizontal orientation upon the rotation of a respective one of said clamp levers;

a spool assembly including a rod rotatably coupled between the side faces of the housing within an interior space of said housing, a cargo strap having a first end coupled to the rod and a second end extending through a bore formed in the top face of the housing with a hook coupler mounted thereon, and a pair of spring containers each mounted on one of the side faces of the housing about an associated end of the rod with each said spring container including a coil spring situated about the rod and having a first end coupled to the rod and a second end coupled to the respective spring container for urging the strap into a retracted orientation;

a locking assembly including a pivot member coupled between the spring containers and residing above the rod of the spool assembly in parallel relationship therewith, a pawl having a first end pivotally coupled to the pivot member and an intermediate portion releasably engaged with one of a plurality of cutouts in a ratchet wheel mounted on the pivot member, the pawl having a first orientation for precluding the rotation of the spool assembly and reeling of the strap and a second orientation for allowing the rotation of the spool assembly and reeling of the strap, a spring urging the pawl into the first orientation thereof, an elongated arm having a first end pivotally coupled to a second end of the pawl, and a lever with an intermediate extent pivotally coupled to the top face of the housing with a first end of the lever extending through a cut out formed in the top face of the housing and a second end pivotally coupled to a second end of the elongated arm, wherein the pawl is disengaged with the ratchet wheel in the second orientation thereof upon the depression of the first end of the lever; and a tightening stick including an elongated bar with a lower end having an eyelet formed therein for rotatably receiving a portion of the rod between the ratchet wheel and one of the spring containers and an upper end extending through an elongated slot formed in the top face, the tightening stick further including a radially extending member with a spring biased pawl mounted thereon for engaging the ratchet wheel, thereby reeling the strap when the elongated bar is reciprocated.

* * * * *